(12) United States Patent
Choy

(10) Patent No.: US 6,351,234 B1
(45) Date of Patent: Feb. 26, 2002

(54) COMBINATION MICROWAVE PASSIVE INFRARED MOTION DETECTOR WITH ANTI-MASKING EVALUATION

(75) Inventor: Jake Choy, Toronto (CA)

(73) Assignee: Digital Security Controls Ltd., Concord (CA)

( * ) Notice: Subject to any disclaimer, the term of this patent is extended or adjusted under 35 U.S.C. 154(b) by 0 days.

(21) Appl. No.: 09/570,816

(22) Filed: May 15, 2000

(51) Int. Cl.⁷ .......................... G01S 13/86; G01S 13/88
(52) U.S. Cl. .......................... 342/53; 342/27; 342/195; 340/541; 340/552; 340/555; 340/565; 340/567
(58) Field of Search .............................. 342/20, 27, 28, 342/52, 53, 56, 57, 58, 59, 89, 90, 175, 192–197; 340/541, 552, 555, 565, 566, 567, 506, 571, 540

(56) References Cited

U.S. PATENT DOCUMENTS

| 5,287,111 A | * | 2/1994 | Shpater | 342/28 |
| 5,317,304 A | * | 5/1994 | Choi | 340/571 |
| 6,191,688 B1 | * | 2/2001 | Sprouse | 340/506 |
| 6,215,399 B1 | * | 4/2001 | Shpater | 340/567 |

* cited by examiner

Primary Examiner—Bernarr E. Gregory

(57) ABSTRACT

A motion detector of an alarm system has a microwave sensor and a passive infrared sensor, and includes signal processing logic for initiating an anti-masking evaluation upon detection of certain conditions. The detector then samples the sensor signals and compares the signals to a series of possible outcomes. Some of the possible outcomes represent masking conditions, while others represent normal conditions. A match with masking conditions results in an alarm signal being generated.

10 Claims, 1 Drawing Sheet

COMBINATION MICROWAVE PASSIVE INFRARED MOTION DETECTOR WITH ANTI-MASKING EVALUATION

BACKGROUND OF THE INVENTION

The present invention relates to motion detectors and in particular, to a combination passive infrared sensor and microwave sensor with anti-masking testing logic.

Dual technology motion detectors, and in particular, a passive infrared sensor, in combination with a microwave sensor, has certain desirable characteristics. The passive infrared sensor detects a moving heat source, whereas the microwave sensor transmits microwave signals and evaluates returned signals for a moving object. By combining these two technologies, the detector is less sensitive to false alarms. Normally, the detector only produces an alarm signal if both sensors detect motion.

Masking is a technique where the detector is partially covered or shielded such that the detector does not monitor the actual space. The passive infrared sensor can be coated with a paint or other non transparent coating and this coating acts as a barrier between the sensor and the monitored space. In most cases, these coverings are essentially transparent to the microwave signals. It is also possible to mask the entire detector by placing a box around the detector. In this case, both the microwave sensor and the passive infrared sensor are effectively masked.

Some detectors include a feature to predict whether a masking event has occurred. Unfortunately, these techniques identify situations which are typical of masking but not limited to masking. For example, the detector may determine that a person has come in close proximity to the detector and on this basis, predicts that a masking event has occurred. In actual fact, the person may have inspected the sensor for perfectly valid reason and subsequently departed. This approach for identifying possible masking events produces false alarms.

The present invention provides a detector with improved characteristics with respect to detecting possible masking conditions.

SUMMARY OF THE INVENTION

A motion detector according to the present invention, comprises a passive infrared sensor and a microwave sensor in combination with a processing arrangement for processing the signals from the sensors and determining alarm conditions. When an alarm condition is determined, the detector produces an alarm signal. The processing arrangement includes logic for recognizing a condition which indicates a possible masking opportunity and upon recognizing a masking opportunity, the logic initiates an anti-masking process. The anti-masking process reviews the signals of the sensors after the initiation of the anti-masking process and compares the signals to a predetermined series of possible sensor signals. This predetermined series of possible sensor signals includes some of which indicate normal non alarm conditions and others which represent alarm conditions. The logic produces an anti-masking alarm when the comparison of the signals indicates an alarm condition.

According to an aspect of the invention, the anti-masking process reviews the signals from both sensors for a predetermined period of time following detection of a masking opportunity.

According to yet a further aspect of the invention, the sensor signals which indicate non alarm conditions include the microwave sensor producing signals indicating a person moving away from the sensor and the passive infrared sensor continues to sense a person.

According to yet a further aspect of the invention, the sensor signals which indicate an alarm condition include 1) said microwave sensor produces signals indicating a person is moving away from the sensor and the passive infrared sensor fails to detect a person and 2) the microwave sensor fails to detect a person and the passive infrared sensor fails to detect the person.

According to yet a further aspect of the invention, the microwave detector is downwardly angled approximately 30 degrees to allow viewing of the space below the sensor.

According to yet a further aspect of the invention, the microwave sensor includes a self test feature to evaluate the operational status of the microwave sensor.

According to yet a further aspect of the invention, the processing arrangement includes a table of possible pairs of sensor readings and upon initiating an anti-masking process, compares the signals to said sensors after a predetermined time period with said table of possible pairs of sensor readings, and based thereon, makes a determination whether the anti-masking alarm signal is produced.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
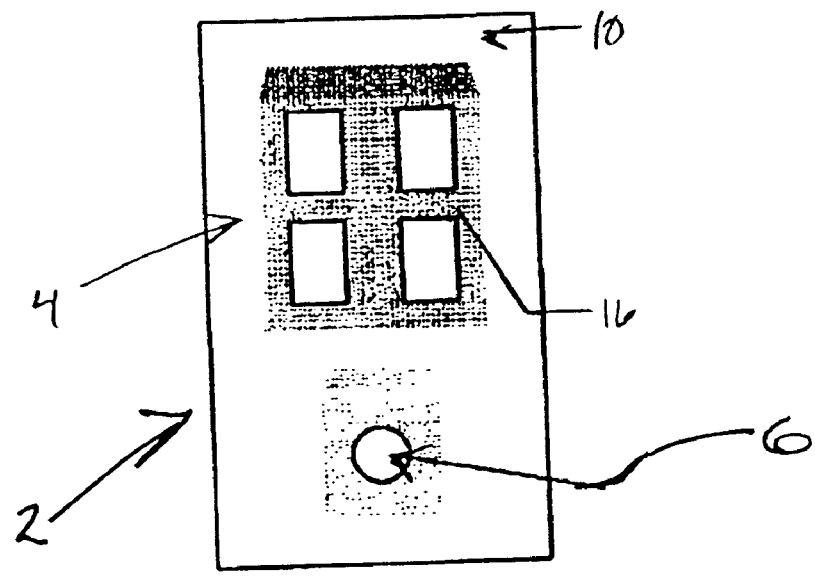
FIG. 1 is a front view showing details of a dual technology motion detector.
Figure 2:
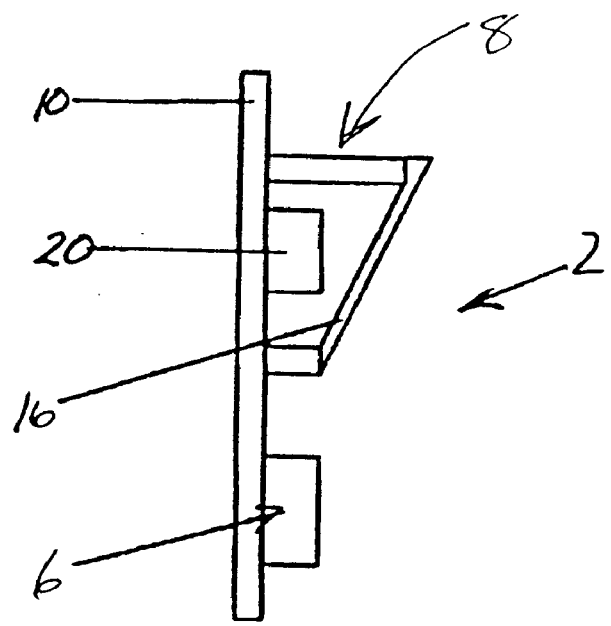
FIG. 2 is a side view the dual sensor motion detector.

The dual technology motion detector 2 of FIG. 1 includes a microwave sensor 4 and a passive infrared sensor 6. The microwave sensor 4 includes a microwave transceiver 16 mounted at an angle of approximately 30 degrees to the printed circuit board 10. The printed circuit board 10 includes an angled mount 8 for receiving and securing the microwave transceiver 16. A signal processing logic arrangement 15 is provided on the circuit board. This allows the motion detector, and in particular, the microwave sensor 4, to view a space below and in front of the detector.

Previously microwave detectors have mounted the microwave transceiver parallel to the printer circuit board and 10, which is vertically orientated such that the device is vulnerable to attack from below, as the sensor does not monitor this space. The angled mounting arrangement 8 also supports the transceiver 16 forward of the printed circuit board 10 and slightly in front of the passive infrared sensor 6. In this way, the passive infrared sensor does not shield the microwave transceiver 16.

The passive infrared sensor 16 is mounted below the microwave sensor 4 and will includes a lens arrangement for focussing received infrared radiation from the monitored space. This lens is generally transparent to the microwaves produced by the transceiver 16 and reflected back from the monitored space.

As can be appreciated, detectors are vulnerable to sabotage including masking. A person approaches the detector when the alarm system is not armed and coats the lens of the detector to render the passive infrared sensor non effective. Another possible masking approach is to place a box or shield about the detector. In this way, both the microwave sensor and the passive infrared sensor are shielded. In dual technology detectors, an alarm is produced when both sensors detect an alarm condition.

With the present detector and the angled microwave sensor, a person approaching the sensor and within a certain distance thereof, will automatically initiate an anti-masking algorithm. This is in contrast to other prior art detectors which predicted a masking condition under these circumstances. With the motion detector of the present invention, the approach of a person and the detection of a person within a short distance of the detector causes the device to initiate an anti-masking algorithm. If the detector microwave sensor subsequently detects the person moving away from the detector, and the passive infrared detector also detects a heat source, then the anti-masking algorithm is stopped and the device returns to normal operation. If the microwave sensor detects the person moving away but the passive infrared sensor fails to detect the presence of the person, this indicates a possible masking of the passive infrared sensor and thus, a possible masking condition has occurred and a masking alarm is produced.

A third condition which may occur is the microwave sensor does not detect a person moving away and the passive infrared sensor fails to detect a person. These conditions could occur if a box or shield is placed about the detector and a masking alarm is produced.

As can be appreciated from above, the device detects possible masking conditions and initiates a subsequent testing process to review and consider the results from the sensors and compare these results with a series of possible pairs of results previously determined and stored in the device. These previously stored pairs are either indicative of a normal condition or indicative of a masking condition. If the actual sensed conditions correspond to conditions of a masking condition, then a masking alarm is produced. The signals from the sensorrs are compared to the possible signals combinations after a predetermined time (a few seconds to several minutes) after initiating the anti masking process. It can be appreciated the anti-masking process can also be continued or restarted depending on the conditon of the sensors. With this arrangement, the number of false alarms is significantly reduced while the device more reliably evaluates possible masking conditions.

The following is a chart of possible sensor pairs that may occur after an anti-masking process has been initiated.

| Chart #1: Possible Scenarios Explaining Anti-masking | |
| --- | --- |
| Scenario #1 | |
| As a person approaches the detector | |
| 1) Normal MW picks up the individual | MW alarm signalled |
| 2) PIR picks up the individual. | PIR alarm signalled Detector alarm initiated |
| 3) A/M MW picks up the individual when close to the detector | Anti-Mask process started |
| As a person moves away from the detector | |
| 1) Normal MW picks up the individual | MW alarm signalled |
| 2) PIR picks up the individual. | PIR alarm signalled Detector alarm initiated |
| 3) A/M MW no longer detects the individual | Anti-Mask process terminated No Anti-Mask alarm initiated.* |
| Scenario #2 | |
| As a person approaches the detector | |
| 1) Normal MW picks up the individual | MW alarm signalled |
| 2) PIR picks up the individual. | PIR alarm signalled Detector alarm initiated |
| 3) A/M MW picks up the individual when close to the detector | Anti-Mask process started |
| As the person spray paints the PIR lens. | |
| 1) Normal MW picks up the individual even through the paint | MW alarm signalled |
| 2) PIR can't pick up the individual through the paint. | No PIR alarm signalled No Detector alarm initiated |
| 3) A/M MW picks up the individual when close to the detector | Anti-Mask process continues |
| When the person has left the regular detected area | |
| 1) MW detects him moving away. | MW alarm signalled |
| 2) PIR can't pick up anything because of the paint. | No PIR alarm signalled No Detector alarm initiated |
| 3) A/M MW no longer detects the individual | Anti-Mask process stops (restore) Anti-Mask alarm initiated.** |
| Scenario #3 | |
| As a person walks right up to the detector. | |
| 1) Normal MW picks up the individual | MW alarm signalled |
| 2) PIR picks up the individual | PIR alarm signalled |
| 3) A/M MW picks up the individual when close to the detector | Anti-Mask process started |
| The person places a metallic box in front of the detector. | |
| 1) Normal MW can't see motion | No MW alarm signalled |
| 2) PIR can't see motion. | No PIR alarm signalled |
| 3) A/M MW can't see motion. | Anti-Mask process stops (restore) |
| The person leaves the room. | |
| 1) Normal MW can't see motion. | No MW alarm signalled |
| 2) PIR can't see motion. | No PIR alarm signalled |
| 3) A/M MW can't see motion. | Anti-Mask process stops (restore) Anti-Mask alarm initiated.*** |

*Because the A/M MW detected the person close to the detector the anti-mask process started. When the person walked away the A/M MW no longer detected him and the anti-mask process was terminated (restore). BECAUSE BOTH the regular MV and PIR initiated an alarm signal as the person walked away (intrusion alarm condition) the anti-masking alarm is cancelled.
**The A/M MW detects the person close to the detector and the anti-mask process started. The person spray paints the lens and walks away. As he walks away the A/M MW restores and the regular MV initiates an alarm signal. BUT the PIR cannot initiate an alarm signal because of the paint and no intrusion alarm is initiated. Without the intrusion alarm, AFTER the A/M MW restoral, an anti-mask alarm is generated.
***Because of the box in front of the detectors none of the detection systems can see motion. HOWEVER, since the A/M MW had initiated the anti-mask procedure and then was restored it now looks for an intrusion alarm. If it sees one, the anti-mask alarm is cancelled. IF it does not see one the anti-mask alarm is signalled.

The microwave sensor also includes a relay 20 which is positioned behind the transceiver 16 and the relay is controlled by said circuit board to turn on and off in a predetermined manner. The relay 20 moves as it turns on and off and this motion is detected by transceiver 16. The circuit board knows when the relay is activated to test the transceiver and therefore looks for the signal from the transceiver. If the appropriate signal is received, the transceiver is working properly and if no signal is received a fault of the transceiver is identified. This relay allows for a self testing process for the transceiver and the circuitry which processes the signal of the microwave sensor. This self test can be carried out on demand as determined by the circuit board or on a scheduled or event basis. As the relay produces motion the processing algorithm used to determine motion in the monitored space is used to determine motion of the relay. Therefore during a self test the circuitry is waiting for an indication of motion in the space.

The angled mounting of the transceiver advantageously allows the relay to be located behind the transceiver and in front of the circuit board. Preferably the relay is mounted directly on the circuit board.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A motion detector comprising a passive infrared sensor and a microwave sensor having a microwave transceiver, said motion detector including a signal processing arrangement for processing signals from said sensors and determining alarm conditions and producing an alarm signal, said signal processing arrangement including logic for recognizing a condition which indicates a possible masking occurrence and initiating an anti-masking process, said anti-masking process comparing the signals of said sensors to a predetermined series of possible sensor signals some of which indicate normal non-alarm conditions and others represent alarm conditions, and producing a masking alarm signal when the comparison of said signals indicates an alarm condition.

2. A motion detector as claimed in claim 1 wherein said anti-masking process compares the signals from both sensors during a predetermined period of time following detection of a possible masking occurrence.

3. A motion detector as claimed in claim 2 wherein said predetermined series of possible sensor signals which indicate non alarm conditions include the microwave sensor producing signals indicating a person is moving away from the sensor and the passive infrared continues to sense the person.

4. A motion detector as claimed in claim 3 wherein said predetermined series of possible sensor signals which indicate an alarm condition include
   1) said microwave sensor produces signals indicating a person is moving away and said passive infrared sensor fails to detect a person, or
   2) said microwave sensor fails to detect a person and said passive infrared sensor fails to detect a person.

5. A motion detector as claimed in claim 4 wherein said microwave detector is downwardly angled approximately 30°.

6. A motion detector as claimed in claim 5 wherein said microwave sensor includes a self test to evaluate the operational status of the microwave sensor.

7. A motion detector as claimed in claim 3 wherein said predetermined series of possible sensor signals which indicate an alarm condition include
   1) said microwave sensor produces signals indicating a person is moving away and said passive infrared sensor fails to detect a person, or
   2) said microwave sensor and said passive infrared sensor each produce signals indicating the monitored space is empty of an intruder.

8. A motion detector as claimed in claim 1 wherein said microwave sensor includes a switch device controlled by said circuit board which can be activated to produce movement thereof, said switch device being located between said circuit board and said transceiver, said transceiver sensing movement of said switch device whereby said switch device when activated produces a motion test to be sensed by the microwave sensor and the results of the motion test indicates the operating status of said transceiver.

9. A motion detector as claimed in claim 1 wherein said signal processing arrangement includes a table of possible pairs of sensor readings of said microwave sensor and said passive infrared sensor, and said anti-masking process compares the signals from said sensors after a predetermined time period with said table of possible pairs of sensors readings and based on said comparison makes a determination whether said masking alarm signal is produced.

10. A motion detector comprising a passive infrared sensor and a microwave sensor and a signal processing arrangement for processing signals from said sensors and determining alarm conditions and producing an alarm signal, said signal processing arrangement including signal processing logic for recognizing a condition which indicates a possible masking occurrence and initiating an anti-masking evaluation, said anti-masking evaluation comparing the signals of said sensors after initiating the anti-masking evaluation and with a predetermined series of possible sensor signals some of which indicate normal non-alarm conditions and others represent alarm conditions, and producing a masking alarm signal when the comparison of said signals indicates an alarm condition and wherein said microwave sensor includes a self testing motion relay located behind a transceiver of said microwave sensor, said motion relay when activated producing motion which is detectable by said transceiver and forms part of a self test of said microwave sensor.

* * * * *